United States Patent
Senarath et al.

(10) Patent No.: US 8,515,474 B2
(45) Date of Patent: Aug. 20, 2013

(54) SYSTEM AND METHOD FOR SCHEDULING USERS ON A WIRELESS NETWORK

(75) Inventors: Gamini Senarath, Nepean (CA); Israfil Bahceci, Nepean (CA); Peiying Zhu, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 178 days.

(21) Appl. No.: 12/690,804

(22) Filed: Jan. 20, 2010

(65) Prior Publication Data

US 2011/0177821 A1    Jul. 21, 2011

(51) Int. Cl.
*H04B 7/00*    (2006.01)

(52) U.S. Cl.
USPC ............. 455/509; 455/42; 455/44; 455/500; 455/501; 455/502; 370/312; 370/329; 370/343; 370/336; 370/344; 375/295; 375/353

(58) Field of Classification Search
USPC ............. 370/204–208, 319–337, 468–473; 455/450–453, 42–45, 509–513
See application file for complete search history.

(56) References Cited

U.S. PATENT DOCUMENTS

| | | | |
|---|---|---|---|
| 6,351,461 B1 * | 2/2002 | Sakoda et al. | 370/335 |
| 6,788,687 B2 | 9/2004 | Bao et al. | |
| 7,103,350 B2 | 9/2006 | Au et al. | |
| 7,412,254 B2 | 8/2008 | Senarath et al. | |
| 7,609,661 B2 | 10/2009 | Chae et al. | |
| 7,733,977 B2 | 6/2010 | Kuri et al. | |
| 7,940,725 B2 | 5/2011 | Jeong | |
| 8,116,805 B2 | 2/2012 | Das et al. | |
| 8,238,958 B2 | 8/2012 | Bourlas et al. | |
| 2004/0141483 A1 | 7/2004 | Zeira et al. | |
| 2005/0220176 A1 | 10/2005 | Zeira et al. | |
| 2006/0094363 A1 | 5/2006 | Kang et al. | |
| 2006/0094372 A1 | 5/2006 | Ahn et al. | |
| 2007/0189234 A1 | 8/2007 | Heo et al. | |
| 2007/0254652 A1 | 11/2007 | Khan et al. | |
| 2008/0166976 A1 | 7/2008 | Rao | |
| 2008/0232332 A1 | 9/2008 | Kaminski et al. | |
| 2008/0280638 A1 | 11/2008 | Malladi et al. | |
| 2009/0125363 A1 | 5/2009 | Frederiksen et al. | |

(Continued)

FOREIGN PATENT DOCUMENTS

CN    1545217 A    11/2004
CN    101272172 A    9/2008

(Continued)

OTHER PUBLICATIONS

International Search Report, PCT International Application No. CN2011/070409, dated Apr. 21, 2011, 3 pages.

(Continued)

*Primary Examiner* — Dai A Phuong
(74) *Attorney, Agent, or Firm* — Slater & Matsil, L.L.P.

(57) ABSTRACT

In accordance with an embodiment, a method of operating a base station configured to operate with user devices includes scheduling a first user device in a first slot, scheduling the first user device for at least one further slot, and transmitting an assignment for the at least one further slot to the first user device. The first slot has a first resource block (RB) and a first transmission time interval (TTI) and the at least one further slot has the first RB and a second TTI.

30 Claims, 6 Drawing Sheets

(56) References Cited

U.S. PATENT DOCUMENTS

| | | | |
|---|---|---|---|
| 2009/0131068 A1 | 5/2009 | Wu et al. | |
| 2009/0285160 A1 | 11/2009 | Cheng et al. | |
| 2010/0027688 A1 | 2/2010 | Suh et al. | |
| 2010/0173638 A1* | 7/2010 | Aiba et al. | 455/450 |
| 2010/0189080 A1 | 7/2010 | Hu et al. | |
| 2010/0210295 A1 | 8/2010 | Koc et al. | |
| 2010/0304776 A1 | 12/2010 | Wu et al. | |
| 2011/0039569 A1 | 2/2011 | Narasimha et al. | |
| 2011/0039589 A1 | 2/2011 | Skov | |
| 2011/0111766 A1 | 5/2011 | Yang et al. | |
| 2011/0310879 A1* | 12/2011 | Wu et al. | 370/345 |

FOREIGN PATENT DOCUMENTS

| | | |
|---|---|---|
| CN | 101272388 | 9/2008 |
| CN | 101305538 | 11/2008 |
| CN | 101370240 | 2/2009 |
| CN | 101378299 | 3/2009 |
| CN | 101399572 A | 4/2009 |
| CN | 101626260 | 1/2010 |
| EP | 1811686 A2 | 7/2007 |
| EP | 2056614 | 5/2009 |
| EP | 2510729 A1 | 10/2012 |
| JP | 2008072722 | 3/2008 |
| WO | WO2008/073013 | 6/2008 |
| WO | WO2008/076940 | 6/2008 |
| WO | WO2009/100567 | 8/2009 |
| WO | WO2009/138841 | 11/2009 |

OTHER PUBLICATIONS

Notification of Transmittal of the International Search Report and the Written Opinion of the International Searching Authority, or the Declaration, International Application No. PCT CN2011/070409, dated Apr. 21, 2011, 3 pages.

Written Opinion of the International Searching Authority, International Application No. PCT CN2011/070409, dated Apr. 21, 2011, 4 pages.

Senarah, Gamini et al., "Power Control and ICIC for Uplink in LTE," Huawei Technologies, Co., Ltd., Aug. 14, 2009, 8 pages.

Yates, R. et al., "Integrated power control and base station assignment," IEEE Transactions on Vehicular Technology, vol. 44, No. 3, Aug. 1995, pp. 638-644.

Xiao, Weimin et al., "Uplink Power Control, Interference Coordination and Resource Allocation for 3GPP E-UTRA" IEEE Vehicular Technology Conference, Sep. 2006, 5 pages.

Gjendemsjo, Anders et al., "Binary Power Control for Sum Rate Maximization over Multiple Interfering Links" IEEE Transactions on Wireless Communications, vol. 7, No. 8, Aug. 2008, pp. 3164-3173.

Yates, Roy "A Framework for Uplink Power Control in Cellular Radio Systems" IEEE Journal on Selected Areas in Communications, vol. 13, No. 7, Sep. 1995, pp. 1341-1347.

Zander, Jens "Performance of Optimum Transmitter Power Control in Cellular Radio System" IEEE Transactions on Vehicular Technology, vol. 41, No. 1, Feb. 1992, pp. 57-62.

Halpern, Samuel W., "Reuse Partitioning in Cellular Systems" Proceedings of $33^{rd}$ IEEE Vehicular Technology Conference, vol. 33, May 1983, pp. 322-327.

Foschini, Gerard J. et al., "A Simple Distributed Autonomous Power Control Algorithm and its Convergence" IEEE Transactions on Vehicular Technology, vol. 42, No. 4, Nov. 1993, pp. 641-646.

Senarath, Gamini et al., "Multi-hop Relay System Evaluation Methodology (Channel Model and Performance Metric)" IEEE 802.16 Broadband Wireless Access Working Group, http://ieee802.org/16>, Feb. 2007, 1 page.

PCT International Search Report, PCT/CN2011/070890, Huawei Technologies, Co., Ltd. et al., mailed May 19, 2011, 9 pages.

Notification of Transmittal of The International Search Report and The Written Opinion of the International Searching Authority, or the Declaration; Huawei Technologies, Co., Ltd, et al., PCT/CN2010/079496, dated Mar. 17, 2011, 11 pages.

Notification of Transmittal of the International Search Report and the Written Opinion of the International Searching Authority, or the Declaration, International Application No. PCT CN2011/070409, dated Apr. 21, 2011, 10 pages.

Myung, H. G., et al., "Single Carrier FDMA for Uplink Wireless Transmission," IEEE Vehicular Technology Magazine, Sep. 2006, pp. 30-38.

"$3^{rd}$ Generation Partnership Project; LTE; Evolved Universal Terrestrial Radio Access (E-UTRA); Physical layer procedures," Technical Specification 136.213, Feb. 2009, pp. 1-75, vol. 8.5.0.

"$3^{rd}$ Generation Partnership Project, Evolved Universal Terrestrial Radio Access (E-UTRA); Medium Access Control (MAC) protocol specification," Technical Specification 136.321, Jan. 2009, pp. 1-44, vol. 8.4.0.

"$3^{rd}$ Generation Partnership Project, Evolved Universal Terrestrial Radio Access (E-UTRA); Physical layer procedures," Technical Specification 36.213, Mar. 2009, pp. 1-77, vol. 8.6.0.

Extended European Search Report and Supplementary European Search Report received in European Application No. 10835481.2, mailed Dec. 21, 2012, 9 pages.

Kim, D., et al., "Proposed Modification on Power Control Section (AWD-15.3.9.4)," IEEE 802.16 Broadband Wireless Access Working Group, IEEE C802.16m-09/ 1524r1, Jul. 6, 2009, 6 pages.

Hande, Prashanth et al., "Distributed Uplink Power Control for Optimal SIR Assignment in Cellular Data Networks" IEEE Communications Society, Proceedings IEEE Infocom, 13 pages, Apr. 2006.

3GPP TSG RAN v8.8.0, "Evolved Universal Terrestial Radio Access: Physical Layer Procedures (3GPP TS.36.213)" 77 pages, Sep. 2009.

Knopp, R. "Information Capacity and Power Control in Single-Cell Multiuser Communications" Proceedings of IEEE International Conference on Communications, vol. 1, pp. 331-335, Jun. 1995.

Dahlman, E., et al., "Key Features of the LTE Radio Interface," Ericsson Review, pp. 77-80, No. 2., 2008.

Jalali, A., et al., "Data Throughput of CDMA-HDR a High Efficiency-High Data Rate Personal Communication Wireless System," IEEE $51^{st}$ Vehicular Technology Conference Proceedings, 6 pages, vol. 3., May 2000.

European Search Report, Application No. 11734371.5-2412/ 2471327, PCT/CN2011/070409, Huawei Technologies Co., Ltd., 9 pages, mailing date Jun. 6, 2012.

"Further Simulation Results of User Grouping Methods for Downlink Inter-cell Interference Coordination," RI-083104, 3GPP TSG-RAN WG1 #54, Jeju, Korea, 6 pages, Aug. 2008.

Mueller, Andreas et al., "Cooperative Interference Prediction for Enhanced Link Adaptation in the 3GPP LTE Uplink," IEEE, 6 pages, May 2010.

\* cited by examiner

Figure 1

| TTI | 1 | 2 | 3 | 4 | 5 | 6 | 7 | 8 |
|---|---|---|---|---|---|---|---|---|
| Cell A | A1 | A0 | A0 | A2 | A1 | A1 | A3 | A2 |
| Cell B | B1 | B0 | B0 | B2 | B1 | B1 | B3 | B2 |
| Cell C | C1 | C0 | C0 | C2 | C1 | C1 | C3 | C2 |

Figure 2

| TTI | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | |
|---|---|---|---|---|---|---|---|---|---|---|---|---|---|---|---|---|---|---|---|---|---|---|---|---|---|
| Cell A | A1 | A0 | A0 | A0 | A1 | A1 | A1 | A1 | A1 | A2 | A1 | A1 | A1 | A2 | A2 | A2 | A2 | A2 | A3 | A2 | A2 | A2 | A3 | A3 | |

FSS TTIs (1, 10, 19) repeats at every Tfs+1 (9) slots.

Tfd = 4, Tfs+1 = 9, Tfd −1

Figure 3a

| TTI | 1 | 2 | 3 | 4 | 5 | 6 | 7 | 8 |
|---|---|---|---|---|---|---|---|---|
| Cell A | A1 | A2 | A1 | A2 | A3 | A4 | A3 | A4 |

Figure 3b

| TTI | 1 | 2 | 3 | 4 | 5 | 6 | 7 | 8 | 9 | 10 | 11 | 12 |
|---|---|---|---|---|---|---|---|---|---|---|---|---|
| Cell A | A1 | A2 | A3 | A1 | A2 | A3 | A4 | A5 | A6 | A4 | A5 | A6 |

Figure 3c

| TTI | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Cell A | A1 | A2 | A3 | A4 | A1 | A2 | A3 | A4 | A5 | A6 | A7 | A8 | A5 | A6 | A7 | A8 |

Figure 3d

| TTI | 1 | 2 | 3 | 4 | 5 | 6 | 7 | 8 | 9 | 10 | 11 | 12 |
|---|---|---|---|---|---|---|---|---|---|---|---|---|
| Cell A | A1 | A2 | A1 | A1 | A2 | A2 | A3 | A4 | A3 | A3 | A4 | A4 |

Figure 3e

| TTI | 1 | 2 | 3 | 4 | 5 | 6 | 7 | 8 | 9 | 10 | 11 | 12 |
|---|---|---|---|---|---|---|---|---|---|---|---|---|
| Cell A | A1 | A2 | A1 | A2 | A2 | A1 | A3 | A4 | A3 | A4 | A4 | A3 |

Figure 3f

| TTI | 1 | 2 | 3 | 4 | 5 | 6 | 7 | 8 | 9 | 10 | 11 | 12 |
|---|---|---|---|---|---|---|---|---|---|---|---|---|
| Cell A | A1 | A2 | A1 | A2 | A1 | A2 | A3 | A4 | A3 | A4 | A3 | A4 |

Figure 3g

| TTI | 1 | 2 | 3 | 4 | 5 | 6 | 7 | 8 | 9 | 10 | 11 | 12 |
|---|---|---|---|---|---|---|---|---|---|---|---|---|
| Cell A | A1 | A2 | A1 | A2 | A1 | A2 | A1 | A2 | A3 | A4 | A3 | A4 |

Figure 3h

| TTI | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Cell A | A1 | A2 | A3 | A1 | A2 | A3 | A1 | A2 | A3 | A4 | A5 | A6 | A4 | A5 | A6 |

Figure 3i

| TTI | 1 | 2 | 3 | 4 | 5 | 6 | 7 | 8 | 9 | 10 |
|---|---|---|---|---|---|---|---|---|---|---|
| Cell A | A1 | A2 | A3 | A4 | A1 | A2 | A3 | A4 | A1 | A2 |

| TTI | 11 | 12 | 13 | 14 | 15 | 16 | 17 | 18 | 19 | 20 |
|---|---|---|---|---|---|---|---|---|---|---|
| Cell A | A3 | A4 | A5 | A6 | A7 | A8 | A5 | A6 | A7 | A8 |

Figure 3j

| TTI | 1 | 2 | 3 | 4 | 5 | 6 | 7 | 8 | 9 | 10 | 11 | 12 |
|---|---|---|---|---|---|---|---|---|---|---|---|---|
| Cell A | A1 | A2 | A1 | A1 | A2 | A2 | A3 | A4 | A3 | A3 | A4 | A4 |

Figure 3k

| TTI | 1 | 2 | 3 | 4 | 5 | 6 | 7 | 8 | 9 | 10 | 11 | 12 |
|---|---|---|---|---|---|---|---|---|---|---|---|---|
| Cell A | A1 | A2 | A1 | A2 | A2 | A1 | A3 | A4 | A3 | A4 | A4 | A3 |

Figure 3l

| TTI | 1 | 2 | 3 | 4 | 5 | 6 | 7 | 8 | 9 | 10 | 11 | 12 |
|---|---|---|---|---|---|---|---|---|---|---|---|---|
| Cell A | A1 | A2 | A1 | A2 | A1 | A2 | A3 | A4 | A3 | A4 | A3 | A4 |

SYSTEM AND METHOD FOR SCHEDULING USERS ON A WIRELESS NETWORK

TECHNICAL FIELD

The present invention relates generally to wireless communication systems, and more particularly to a system and method for scheduling users on a wireless network.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use a one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

In wireless communication systems, the desired signal level as well as the interference level fluctuates in time due to temporal fading. In systems where multiple users share the same time slot or frequency bandwidth, highest performance is achieved when transmissions occur when the desired signal level is high and the interference level is low. This happens as naturally in downlink transmissions for some systems, such as LTE that are configured to have a user terminal transmit a latest carrier to interference ratio (C/I) value to the base station. In noise limited systems, the C/I value is highest when the desired signal is at the highest level and the interference is at the lowest level.

When a base station selects a user device independently, the interference from all adjacent cells changes during every transmission time interval (TTI). Interference, therefore, fluctuates rapidly. Even if the base station can predict the amplitude of the desired signal from a user device, the fast changing interference environment makes it very difficult for the base station to determine an appropriate modulation and coding selection (MCS) during the link adaptation process. The base station, therefore, will use a considerable fade margin to minimize transmission errors at the cost of lower data rates and system capacity.

SUMMARY OF THE INVENTION

In accordance with an embodiment, a method of operating a base station configured to operate with user devices includes scheduling a first user device in a first slot, scheduling the first user device for at least one further slot, and transmitting an assignment for the at least one further slot to the first user device The first slot has a first resource block (RB) and a first transmission time interval (TTI) and the at least one further slot has the first RB and a second TTI.

In accordance with another embodiment, a method of operating a base station configured to operate with user devices includes scheduling a first user device in a first slot, where the first slot includes a first RB and a TTI. An interference vector having a measurement of interference to at least one neighboring cell is determined for the first user device in the first slot, and interference vectors for a plurality of other user devices are also determined. The method also includes calculating a matching metric between the interference vector of the first user device and interference vectors of each of the plurality of other user devices, choosing a second user device from the plurality of other user devices based on the matching metric and scheduling the second user device for at least one further slot, the at least one further slot comprising the first RB and a second TTI. An assignment for the at least one further slot to the second user device is transmitted.

In accordance with another embodiment, a method of operating a wireless network comprising a first transceiver configured to operate with a plurality of user devices includes determining a first group of slots from a plurality of groups of slots. Each slot includes a RB and a TTI, and each of the plurality of groups of slots has an RB, a first TTI, and a plurality of additional TTIs. The method also includes assigning a first user device to the first group of slots and transmitting the assignment to the first user device.

In accordance with another embodiment, a wireless base station includes a transmitter and a receiver. The base station is configured to determine a first group of slots from a plurality of groups of slots. Each slot has a RB and a TTI, and each of the plurality of groups of slots has an RB, a first TTI, and a plurality of additional TTIs. The base station is also configured to assign a first user device to the first group of slots, assign a second user to a second group of slots, and transmit the assignment to the first and second user devices via the transmitter.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, namely resource scheduling of a broadband wireless network. Embodiments of the invention may also be applied to resource scheduling in other types of networks.

Figure 1:
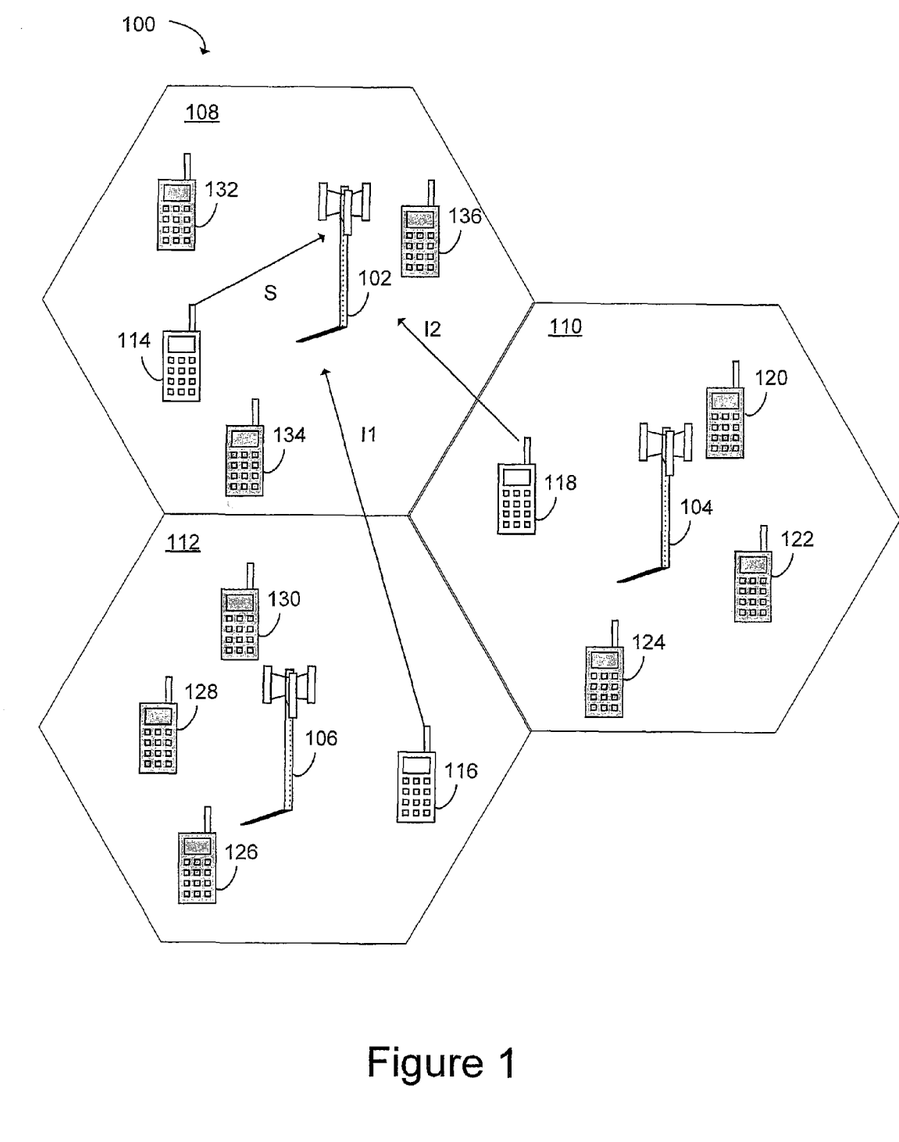
FIG. 1 illustrates a diagram of an embodiment mobile broadband system.

An illustration of an embodiment mobile broadband system 100 is illustrated in FIG. 1. Mobile broadband system 100 is divided into cells 108, 110 and 112, where each cell 108, 110 and 112 has corresponding base station 102, 104 and 106. Mobile terminals or user equipment (UE) 114, 116, 118, 120, 122, 124, 126, 128, 130, 132, 134 and 136 access network 100 through one of base stations 102, 104 and 106. Three base stations 108, 110 and 112 and twelve UEs 114, 116, 118, 120, 122, 124, 126, 128, 130, 132, 134 and 136 are used for simplicity of illustration, however, any number of cells and UEs can be used and provided for in real systems.

In an embodiment, UE 114 is assigned to cell 108, and transmits with a power S in the uplink channel to base station 102. UE 116 is assigned to cell 112 and transmits with a power 51 in the uplink channel to base station 106. Assuming that UE 116 in cell 112 uses the same resource block as UE 114 in cell 108, the transmitted power of UE 116 in cell 112 appears as interference I1 to base station 102 in cell 108. Likewise, UE 118 is assigned to cell 110 and transmits with a power S2 in the uplink channel to base station 104. Also, assuming UE 118 in cell 110 also uses the same resource block as UE 114 in cell 108, the transmitted power of UE 118 in cell 110 appears as interference I2 to base station 102 in cell 108. In a multipath environment, interference signals I1 and I2 can vary according to multipath conditions. UEs 120, 122 and 124 are assigned to cell 110, UEs 126, 128 and 130 are assigned to cell 112 and UEs 132, 134 and 136 are assigned to cell 108, but are not assigned the same resource block at the same time as UEs 114, 116 and 118.

The total interference in I(i) in cell I can be represented by:

$$I(i) = \sum_j \|h_{jk}(i)\|^2 * P_{jk},$$

where $h_{jk}(i)$ is the channel gain from the $k^{th}$ user in the $j^{th}$ cell to the $i^{th}$ cell, and $P_{jk}$ is the transmit power of UE k in cell j. Since user k in cell j is usually selected independently, the interference from all the cells changes in every scheduling instant (every TTI), causing fluctuating received interference that is difficult to predict. Conventional systems set a large fade margin to account for interference variation, which can significantly impact system capacity due to high variability of interference.

In an embodiment of the present invention, a synchronously fixed scheduling (SFS) method is used where a base station does not change a scheduled UE for a given resource block for a certain period of time. Changes in resource block allocation are performed at certain specific frequency selective scheduling (FSS) TTIs that are predetermined across the network. In an embodiment, the TTIs are synchronized across network during deployment or periodically using signaling between base stations. Scheduling for FSS TTIs are performed, for example, by applying frequency selective scheduling to exploit up fades of the signal if the channel is not changing rapidly. Alternatively, other scheduling techniques can be used, for example using an enhanced fair scheduler, an equal throughput scheduler that equalizes the throughput among UEs, or a delay driven scheduler that gives priority to packets needing the lowest delay.

Figure 2:
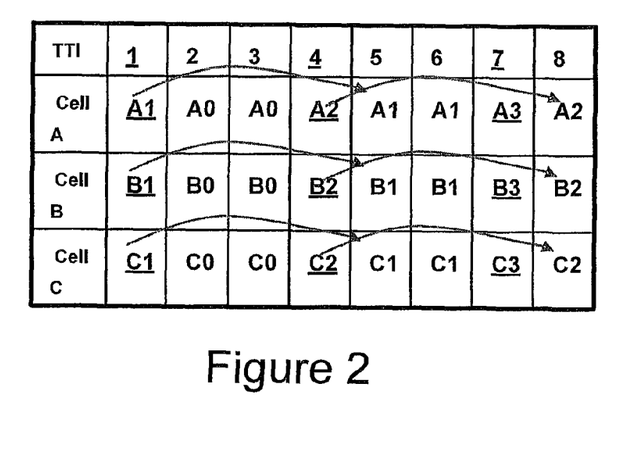
FIG. 2 illustrates an embodiment UE scheduling table for a single resource block.

FIG. 2 illustrates an embodiment UE scheduling table for a single resource block. Each row represents a different cell and each column represents a successive TTI. It should be understood that the UE scheduling table depicted in FIG. 2 is one example of many possible scheduling scenarios. Other scheduling scenarios may include a larger or lesser number of cells, a larger or lesser number of TTIs, a larger or lesser number or UE's different FSS TTI designations, and/or different UE schedules.

In an embodiment, UEs are scheduled in FSS TTI slots that are coordinated among neighboring cells. For example, UE A1 in cell A, is scheduled to transmit during TTI 1. During TTI 1, an signal to noise and interference (SNIR) measurement is made, and the base station of cell A determines an appropriate MCS setting. When UE A1 transmits again during TTI 5, UE A1 is using the newly determined MCS setting. UE A1 transmits again during TTI 6 using the same MCS setting as was used in TTI 5. Because cells B and C also schedule the same UEs (i.e. UE B1 and UE C1) during TTIs 1, 5 and 6, the interference environment and the multipath environment during time intervals 5 and 6 are correlated to or is similar to the interference and multipath environment during time interval 1. In an embodiment, the 4 TTI delay between the measuring TTI 1 and repeated TTI 5 is representative of a feedback and/or measurement delay due to measuring, processing and assigning new MCS settings.

Likewise, UE A2 in cell A is scheduled to transmit during TTI 4. During TTI 4, an SNIR measurement is made, and the base station of cell A determines an appropriate MCS setting. When UE A2 transmits again during TTI 8, UE A2 uses the newly determined MCS setting. Similarly, UEs B2 and C2 also transmit during TTI 4 and TTI 8 in order to maintain a similar multipath environment.

In an embodiment of the present invention, the determination of which UE to schedule at which TTI for a particular resource block is determined by evaluating (1) the amount of network traffic a particular UE generates and (2) an FSS gain for the particular UE. The FSS gain is a function of improvement in instantaneous data rate because the FSS technique prioritizes assignment to the time of up-fades. Such a FSS gain is realized by using an FSS method over a non FSS method. In some embodiments, the FSS gain is related to the performance improvement gained by using a more aggressive MCS level.

Figure 3A:
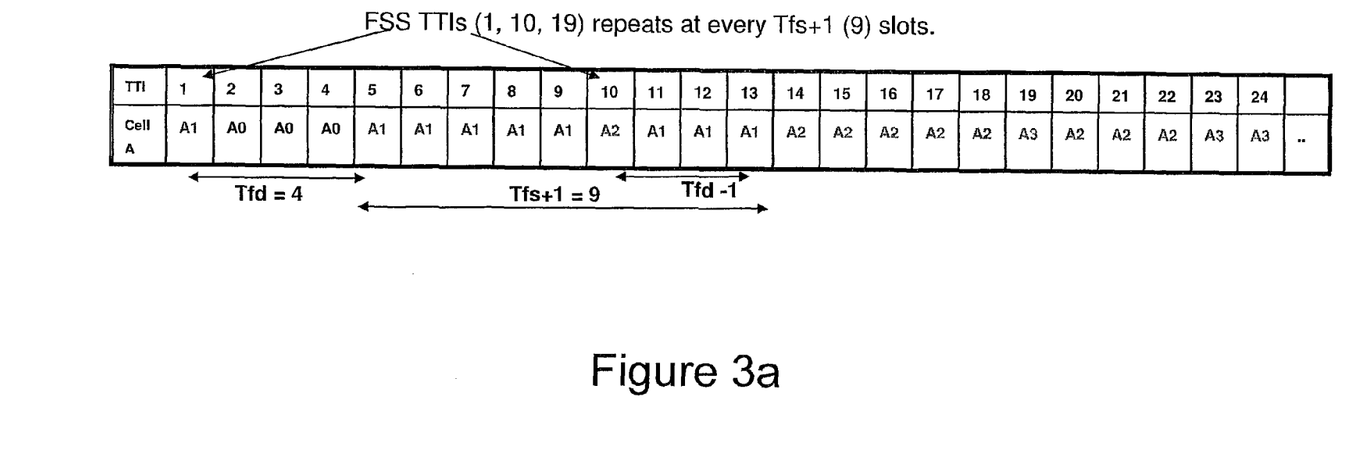
FIGS. 3a-3m illustrate embodiment scheduling tables.

FIG. 3a illustrates another embodiment example of a SFS FSS schedule for Cell A having a repeating frame structure that repeats every Tfs+1 slots, where Tfs is a defined repetition value. In this example embodiment, TTI slots 1, 10 and 19 are designated as FSS slots in which the base station schedules a UE according to local knowledge of the signal and its fading.

As shown in FIG. 3a, UE A1 is scheduled to transmit during TTI 1. After transmission in the FSS slot (e.g TTI #1), the base station measures the actual SNIR of the signal of UE A1 received at the base station in TTI #1. The base station then determines a new MCS level to match the measured SNIR and requests UE A1 to transmit at the same power level using the new MCS level. In this example, the earliest possible slot in which UE A1 can transmit with the new MCS level is TTI slot 5, assuming a feedback delay Tfd of 4 TTIs. The feedback delay is the time in which it takes to perform a SNIR measurement, determine a new MCS, and transmit the new MCS level to the UE. The feedback delay can also be defined as time from the measurement TTI to the actual data transmission TTI within which above actions are performed. It should be noted that Tfd=4 TTIs is one example of a feedback delay, and that other feedback delays can be used in other embodiments.

In an embodiment, a SFS method aims to schedule the same UE for the next Tfs number of slots. For example, in the case of FIG. 3a, Tfs is 8 slots. In many systems, especially those in which fading changes slowly, the eNBs of the UEs do not change much during 8 consecutive slots. Therefore, the SNIR measurement in slot #1 for UE A1 represents a more accurate estimate of the SNIR during these slots.

Before the end of the SFS slot pattern, a new FSS scheduling decision is made for TTI slot 10, (usually the decision is taken a Tfd time before this slot) in which case the SNIR of UE A2 is measured. These slots are known as FSS scheduling slots. In an embodiment, the decision is taken time Tfd before slot 10. In order to increase the proportion of SFS slots, the FSS scheduling slot is planned to occur before the expiration of Tfs, so that when Tfs repetitions are performed, another SFS slot pattern begins. In an embodiment, all base stations or eNBs assign a new UE similar to slot #1. Therefore, in the embodiment of FIG. 3, the SFS scheduling period is Tfs+1 (9), which is the SFS pattern duration of 8 plus one FSS scheduling slot. It should be noted that the schedule shown in FIG. 3 is an example, and other patterns are possible. Furthermore, alternative embodiments can include different schedules, delay values and repetition rates.

In an embodiment, scheduling is performed to provide enough freedom for the scheduler such that the FSS gain is not significantly impacted. In an embodiment, RBs are divided into several pools depending on the proportion of SFS slots to FSS slots used for that RB. Each group can have different Tfs value, for example, Tfs(1)=1 (which represents the case with no SFS), Tfs(2)=2, Tfs(3)=4, Tfs(4)=8, and Tfs(5)=16. Alternatively, other Tfs values can be used. Therefore, the base station can allocate UEs having a high amount of traffic to a RB with a higher Tfs, and allocate UEs with less traffic to RBs that have a lower Tfs value. In some embodiments, different types of users may co-exist with different Tfs values for a given RB group. For example, if Tfs(5)=16 is fully occupied with suitable UEs, the additional UEs satisfying the same criterion could be moved to Tfs=8 group. In an embodiment, even if the most efficient group of SFS is not used, a gain can still be achieved by using the next best SFS group.

In a further embodiment, UEs with different speeds are scheduled into different SFS groups. In one example, scheduling is performed based on average measurements taken over certain TTIs. Because such measurements are less accurate for these UEs, there will be a higher variation in the interference measurements. By separating these UEs, there is less impact the SFS groups of higher efficiency.

In an embodiment, UEs are scheduled to reduce interference variation in time so that an MCS selection can be made based on past measurements. Such measurements are performed using sounding, analyzing network data, or using other techniques such as measurement of the block error rate of previous transmissions.

In an embodiment, interference changes over time for at least two reasons. First, UEs scheduled in the adjacent cells are usually changed from one TTI to another. Embodiment SFS methods, therefore, can be used to reduce variability in interference. Second, even if the scheduled UEs are not changed, their interfering signals could fade, or power may be changed due to changes in the multipath environment such as high speed user device (i.e. a user device is operated in a moving vehicle). High speed UEs have a faster temporal fading fluctuation (compared to feedback delay) and, therefore, do not benefit as much from FSS techniques as stationary UEs whose multipath characteristics do not change as rapidly. In an embodiment, such high speed UEs can be assigned to a pool of RBs, in which prioritization for scheduling is performed based on a mean C/I.

For users with delay sensitive traffic, such as high quality of service (QoS) traffic, significant FSS gain is difficult to realize using conventional scheduling techniques, so high margins are used. In an embodiment, such delay sensitive UEs are allocated to SFS slots to gain the advantage of having a small interference variability, which reduces transmission errors.

In an embodiment, SFS scheduling is performed to maximize an SFS ratio (sfs_ratio), which is defined to be the ratio of number of SFS of slots over the total number of slots for a given RB. In a further embodiment, because SFS slots have a better prediction accuracy, the increase in the number of SFS slots are subject to two embodiment criteria relating to uplink feedback delay and UE speed. In alternative embodiments, other criteria can be used, for example, traffic availability.

The first embodiment criterion is that SFS slots are scheduled to be less than a FSS_max_Delay away from the related FSS slot, where FSS_max_Delay is defined as the time the SNIR measurement at a given TTI is considered as valid to predict the SNIR of a future slot. In an embodiment, if channel conditions such as fading changes fast, FSS_max_Delay is small and the number of SFS slots that can be used within that time is small. If the mean delay of SFS slots (T_fss) to the last FSS scheduling slot is large, compared to the FSS_max_Delay, then the impact on FSS gain is reduced. For example, if T_fss is larger than FSS_max_delay, those SFS slots would not achieve FSS gain. In an embodiment, SFS transmissions are performed a certain FSS_max_delay after the previous FSS slot, such that T_fss<FSS_max_delay. If the sfs_ratio is made larger, more SFS slots are available, however, the system has a higher T_fss. Therefore, an embodiment scheduling method limits sfs_ratio according to FSS_max_Delay.

The second embodiment criterion is that SFS slots are assigned to be less than certain number of TTIs away from last measurement slot in order to maximize the prediction accuracy. In an embodiment, prior measurements with the same scheduling instances are used. If the speed of UEs are high, however, only the average signal measurements provide useful information because the instantaneous values changes quickly. Therefore, for these high speed UEs, a separate SFS slot is used in an embodiment. UEs with different speeds have different T_fss, however, and can be allocated to different SFS slots with similar speeds, delay and traffic requirements.

Figure 3B:
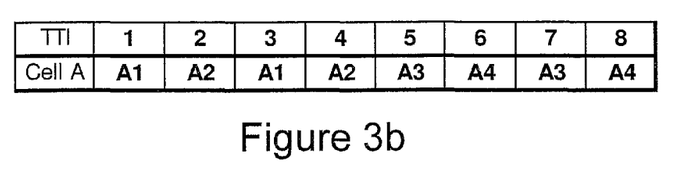
Figure 3C:
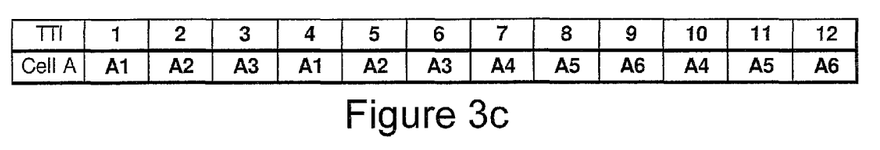
Figure 3D:
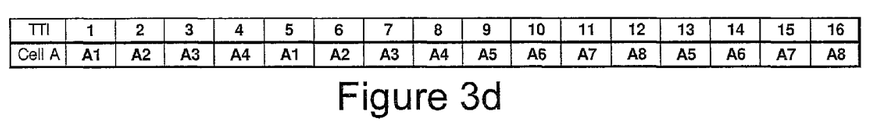

In the embodiments illustrated in FIGS. 3b-3m, a SFS scheduling ratio is maximized while the average delay from the last FSS TTI to the SFS TTIs is minimized and the FFS TTIs to the last measurement TTI is minimized. For example, FIG. 3b illustrates an embodiment UE schedule where T_fss=1, Tfd=2, TTI=Tfs, and sfs_ratio=50%. In TTI 1, an SNIR measurement is made on UE A1 and an MCS level is determined. In TTI 3, the derived MCS level is used for UE A1. FIG. 3c illustrates an embodiment UE schedule where T_fss=1, Tfd=3, TTI=T_fss, and sfs_ratio=50%, and FIG. 3c an embodiment UE schedule where Tfs=1, Tfd=4, TTI=T_fss, and sfs_ratio=50%. In an embodiment, higher patterns with higher Tfd values can be derived by simply repeating the pattern when Tfs=1, TTI=Tfs, and sfs_ratio=50%.

Figure 3E:
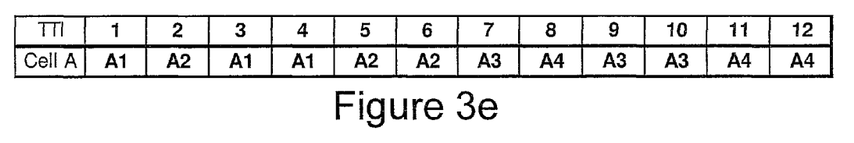
Figure 3F:
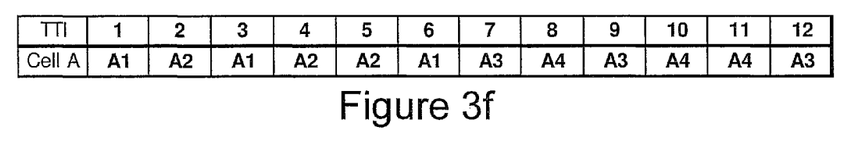
Figure 3G:
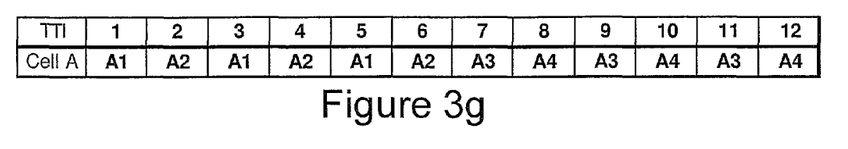

FIGS. 3e-3g illustrate three solutions for the scheduling case where Tfd=2 and the maximum fixed scheduling ratio is 2/3. For example, FIG. 3e illustrates an embodiment UE schedule where T_fss(A1)=2.5 and T_fss(A2)=3.5. It should be noted that, in this case, the solution is not fair to some users because different UEs have different accuracy levels for their SFS slots (e.g., different T_fss values). FIG. 3f illustrates an embodiment UE schedule where T_fss(A1)=3.5 and T_fss (A2)=4.5, which is considered a fair solution for this example. FIG. 3g illustrates an embodiment UE schedule where T_fss(A1)=2 and T_fss (A2)=2. In the solution of FIG. 3g, SFS slots can be used to perform measurements again and decide a next MCS level for the same user for the next SFS slot because they are repeating at Tfd intervals. It should be noted that other solutions can be found in addition to the specific examples shown in this disclosure.

Figure 3H:
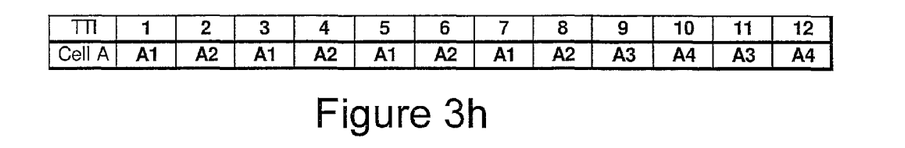
Figure 3I:
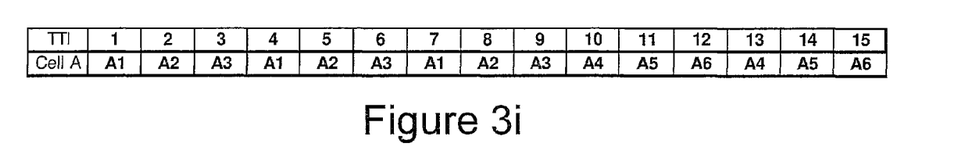
Figure 3J:
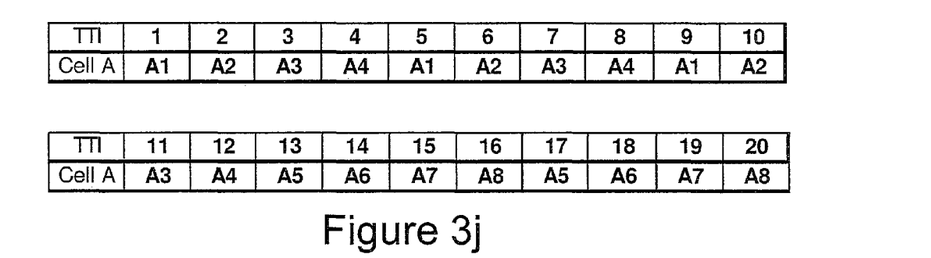

FIGS. 3h-3j illustrate three solutions for the scheduling case where T_Fss=3 and the maximum sfs_ratio=50%. FIG. 3h illustrates the case where Tfd=2 and sfs_ratio=50%, FIG. 3i illustrates the case where Tfd=3 and sfs_ratio=50%, and FIG. 3j illustrates the case where Tfd=4 and sfs_ratio=50%. For higher Tfd values, a solution can be found by repeating the same UE pattern.

Figure 3K:
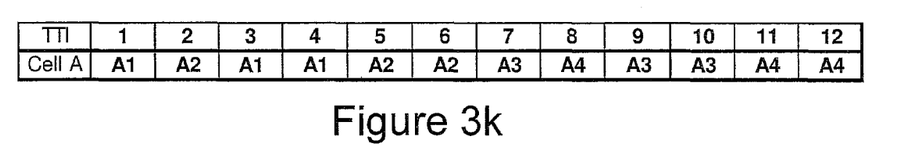
Figure 3L:
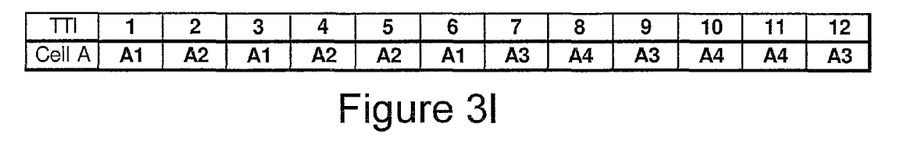
Figure 3M:
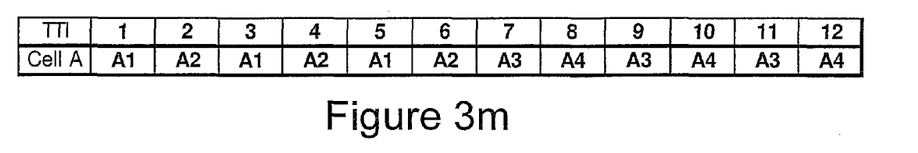

FIGS. 3k-3m illustrate three solutions for the scheduling case where Tfd=2 and the maximum sfs_ratio=67%. FIG. 3k illustrates the case where T_fss(A1)=2.5, T_fss(A2)=3.5, and sfs_ratio=67%, which is not fair to some users, because different UEs have different accuracy levels for their SFS slots (i.e., different T_fss values). FIG. 3l illustrates the case where T_fss (A1)=3.5, T_fss (A2)=3.5 and sfs_ratio=67%, which is a fair solution for all users. FIG. 3m illustrates the case where dT_fss (A1)=2, T_fss (A2)=2 and sfs_ratio=67%, which is a best solution for the Tfd=2 case. SFS slots can be used to do measurements again and decide a next MCS level for the same user for the next SFS slot because they are repeating at Tfd intervals. For higher Tfd values, a solution can be found by repeating the same UE pattern. It should be noted that other solutions can be found in addition to the specific examples shown in this disclosure.

In an embodiment, assigned UEs for a given RB are not changed unless an exception is made using a similar interference signature (SIS) method. For example, the UE can be assigned a previously assigned RB if the UE has a similar interference characteristic to other cells and/or a similar power level. In an embodiment, UEs are not changed on a network-wide basis during non-FSS TTIs, therefore, an interference measurement performed in a previous FSS TTI is used to make an accurate MCS assignment, assuming that the fading of the interfering signals remain the same. In some embodiments, an interference measurement is based on an interference pattern that considers only the few strongest interferers. In some embodiments, SIS methods can be used without synchronization among neighboring base stations.

In an embodiment using a SIS method, UEs are permitted to be changed at any time, but users with similar interference characteristics will be assigned to the next slot, so that interference variation is kept a minimum. By applying embodiment SIS methods, the system has increased throughput, including increased cell-edge throughput because the system experiences, on average, a smaller variation of interference.

If proportional fairness (pf) is used as the scheduler, another embodiment priority factor is added to the following pf priority equation:

$Pf$ Scheduling priority=per user instantaneous rate/ mean per user throughput over last $N$ slots.

New priority factor=$(pf$ scheduling priority$)^x * (sis\_factor)^y$, where x, y are parameters of the scheduler to emphasize one factor over the other and $sis\_$factor=$S(Ia,Ib)$, where Ia is the interference vector of the previous user for a particular RB, and Ib is the interference vectors of the UEb for the particular RB, and S is a function that measures the similarity between a and b interference vectors in terms of their impact on the performance of UEs connected to other eNBs. This impact also depends on the actual total interference experienced by the eNB in that RB and TTI. Alternatively, the impact on the performance of UEs connected to other eNBs is not considered if this information is not available in the specific system. Interference vector Ia contains all the interference a user caused to all the other cells. In an alternative embodiment, Ia contains a metric of the interference a user causes to the m cells that receive the most interference from the user.

In embodiment, the interference vector is determined using downlink measurements to estimate the interference caused by a UE in an uplink.

In an embodiment SIS method, the following steps are performed: (1) the elements of vector Ia are ordered in decreasing strength; (2) the elements of vector Ib are ordered to match the order of vector Ia; and (3) the mean square error $\epsilon=(Ia-Ib)$ is evaluated. In a further embodiment, only UEs are evaluated that satisfy $\epsilon<T$ where T is threshold, and $(\epsilon-T)/T$ is used as a priority factor for UEs for FSS scheduling.

In another embodiment SIS method, where priority is applied without modifying the available priority mechanism (e.g., FSS), the following steps are performed: (1) prioritize users for scheduling a given RB; (2) determine whether $\epsilon<T$ is met for a given threshold T from 1 to n, where n is the number of UEs; (3) if no users are found for a given T, increase T until only one of the n users satisfy the criterion; and (4) select the UE that satisfies $\epsilon<T$. If more than one UE satisfies the criterion, one can be selected randomly or another criterion can be applied, such as throughput already achieved. In an embodiment, n depends on the total number of active UEs in eNB or the base station involved in FSS scheduling.

In a further embodiment, different thresholds T are used for different RBs. For example, T increases from a lower end of the frequency spectrum to the other. In an embodiment, the upper end has a higher variation because all the UEs selected for that have a higher threshold. In an embodiment, a match is found starting from the lower end of the frequency spectrum so that the match is found where T is lowest. If a UE cannot be found, T is increased.

In an embodiment where both SFS and SIS schemes may impact the FSS gain, for example, when the number of active UEs are small, the system is configured to switch back to an FSS mode. In one embodiment, this is done by slowly increasing the number of RBs using the SFS throughout the system across base stations until the system has no more SFS slots. For example, under realistic traffic conditions, some users may not have enough traffic to fit into a RB with higher sfs_ratio. These users can be scheduled for RBs with a lower sfs_ratio at the cost of reduced SFS performance gain. The strict partition of higher sfs_ratio and lower sfs_ratio RBs may be difficult to achieve when these traffic issues are combined with other issues such as load changes and restrictions on the number of successive RBs in LTE. By having a gradual fall back scheme these issues can be addressed.

In an embodiment that uses an FSS method, different groups are defined that have different FSS TTI frequencies. In an embodiments that use an SIS method, however, a trade-off is made between FSS loss and link adaptation loss. When the number of RBs allowed for a given UE is restricted, FSS gain is lost because a UE is unable to pick the best RB with highest FSS gain. Link adaptation loss, which is the loss that occurs due to inaccuracy of the MCS selection, causes errors and retransmission of packets. Therefore, when the allowed difference from one TTI to another is small, the interference variation is small. FSS gain, however, may be impacted due to lack of enough freedom to schedule. If the allowed difference is large, the interference variation becomes high, the link adaptation process may suffer some performance loss.

In a further embodiment, base stations attempt to allocate RBs in successive TTIs to the same user device if there are no issues with traffic and packet delay in order to reduce interference variability. In some embodiments, this is performed instead of allocating multiple RBs in the same TTI. In such embodiments, eNBs attempt to avoid changes in the time axis. In an example embodiment, scheduling a UE includes determining traffic conditions of the UE, determining a delay of the UE, and scheduling the UE to successive TTIs if the determined delay and traffic conditions meet predetermined criteria.

In an embodiment SFS method where network wide superframe synchronization is used (i.e., different eNBs start corresponding FSS subframes synchronously), pattern cycles are synchronized. Alternatively an embodiment SFS method can be implemented without system-wide synchronization. By keeping the same user for successive time slots for a longer duration, the number of changes are reduced, thereby reducing interference variability.

Figure 4:
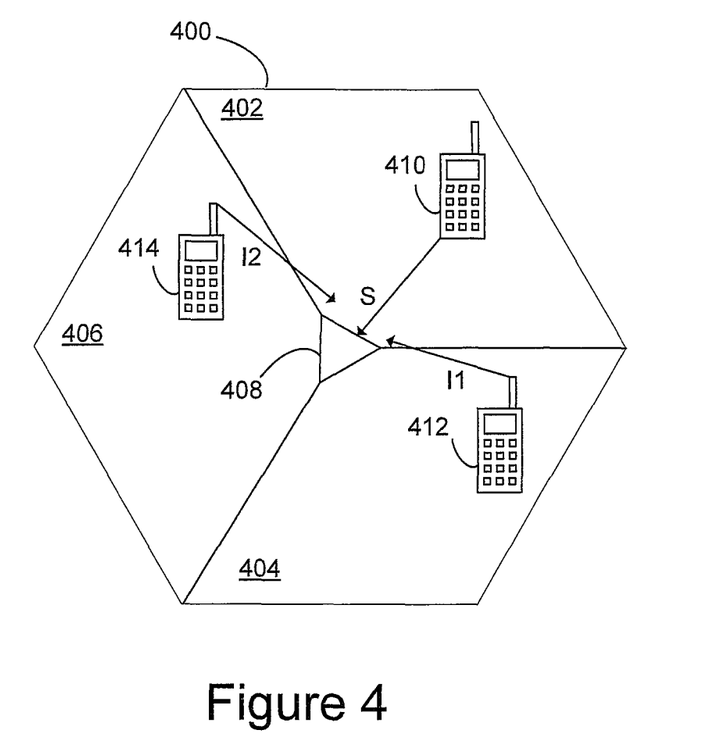
FIG. 4 illustrates an embodiment mobile broadband system, in which embodiment algorithms are applied within sectors of a base station.

In a further embodiment, embodiment FSS, SFS and SIS methods can also be applied to a single base station having multiple sectors. FIG. 4 illustrates an embodiment cell 400 in which an embodiment FSS approach is applied among multiple sectors of the same service cell 408. UE 410 transmits desired signal S within sector 402. UE 412 in sector 404 and UE 414 in sector 406 transmit interfering signals I1 and I2 respectively. If the strongest interferer is one of the adjacent sectors, the base station scheduler uses the scheduling change information in the other sector to assign a more aggressive or less aggressive margin for MCS adaptation.

In an embodiment, a central entity common to three sectors has advance knowledge of when scheduling is changed for a given slot in the adjacent sector. Because the scheduling change in the interfering (strongest) sector is known a priori, the adjacent sector knows that at that time, interference conditions have changed and that past measurements may be inaccurate. Alternatively, instead of using pre-agreed scheduling changes, scheduling changes occur in an ad hoc manner if a UE is not causing a large interference to outside cells (other than the adjacent sectors).

In a further embodiment, scheduling is coordinated among sectors that belong to the same site such that scheduling changes of the UEs interfering with other adjacent sectors of the same base station site are found. Knowledge the scheduling changes are used to change the MCS adaptation process due to having more accurate interference information. For example, scheduling changes of user devices in adjacent sectors of the base station that interfere with the first user device are determined, and a modulation and coding selection (MCS) level for the first user device is then determined based on the schedule change. In one embodiment, it is assumed that UEs do not cause much interference to the sectors belong to other base station sites.

Figure 5:
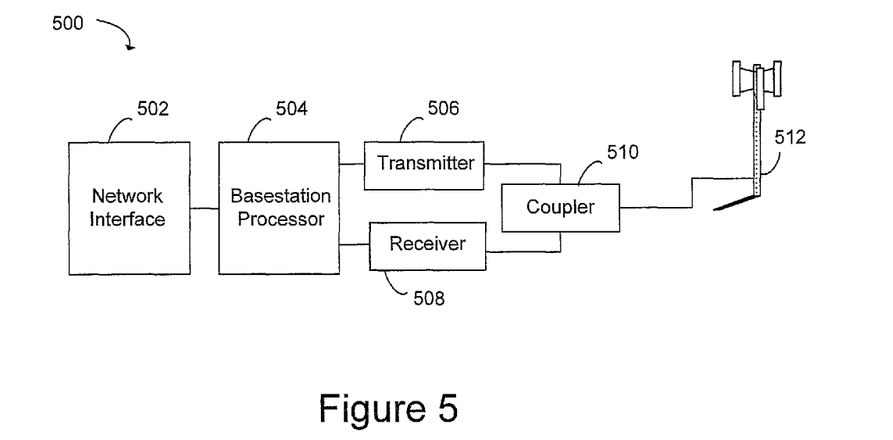
FIG. 5 illustrates a block diagram of an embodiment base station.

A block diagram of an embodiment base station 500 is illustrated in FIG. 5. Base station 500 has a base station processor 504 coupled to transmitter 506 and receiver 508, and network interface 502. Transmitter 506 and receiver 508 are coupled to antenna 512 via coupler 510. Base station processor 504 executes embodiment FSS, SFS and SIS methods and algorithms. In an embodiment of the present invention, base station 500 is configured to operate in a LTE network using an OFDMA downlink channel divided into multiple subbands and using single carrier FDMA in the uplink. In alternative embodiments, other systems, network types and transmission schemes can be used, for example, Wimax, and 1XEV-DO.

Figure 6:
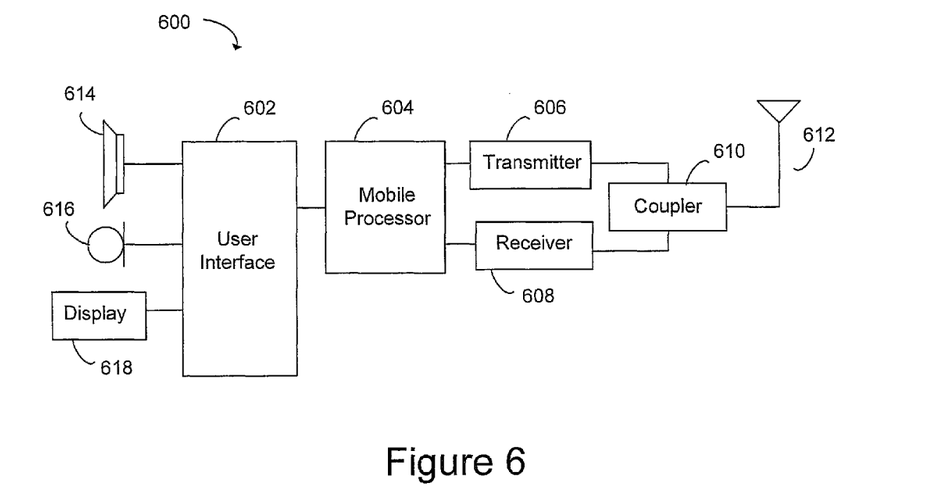
FIG. 6 illustrates a block diagram of an embodiment user device.

A block diagram of an embodiment user device 600 is illustrated in FIG. 6. User device 600 can be, for example, a cellular telephone or other mobile communication device, such as a computer or network enabled peripheral. Alternatively, user device 600 can be a non-mobile device, such as a desktop computer with wireless network connectivity. User device 600 has mobile processor 604, transmitter 606 and receiver 608, which are coupled to antenna 612 via coupler 610. User interface 602 is coupled to mobile processor 604 and provides interfaces to loudspeaker 614, microphone 616 and display 618, for example. Alternatively, user device 600 may have a different configuration with respect to user interface 602, or user interface 602 may be omitted entirely. In embodiment, user device is configured to operate according to embodiment FSS, SFS and SIS methods and algorithms.

Advantages of embodiments of the present invention includes the ability to exploit accurate MCS measurements to use lower fading margins.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a wireless network comprising a first transceiver configured to operate with a plurality of user devices, the method comprising:
    determining a first group of slots from a plurality of groups of slots, wherein
        each slot comprises a resource block (RB) and a transmission time interval (TTI), and each of the plurality of groups of slots comprises a first TTI, and a plurality of additional TTIs following the first TTI, wherein the first TTI and the plurality of additional TTIs form a repeating pattern;
coordinating a timing of the first TTI of the first group of slots to occur at a same time as a further first TTI of a further group of slots at a second transceiver for a same RB;
assigning a first user device to the first group of slots;
transmitting the assignment to the first user device; and
after transmitting the assignment to the first user device, changing an assignment of the first group of slots from the first user device to a second user device, changing comprising assigning the second user device to the first group of slots beginning at the first TTI of the first group of slots, wherein changing the assignment at the first transceiver is synchronized with an assignment change at the second transceiver.

2. The method of claim 1, wherein the first TTI and the plurality of additional TTIs form a repeating pattern for the first group of slots.

3. The method of claim 1, further comprising:
determining a second group of slots from the plurality of groups of slots;
assigning a third user device to the second group of slots; and
transmitting the assignment to the third user device.

4. The method of claim 1, wherein, for each of the plurality of groups of slots:
a first of the plurality of additional TTIs occurs at least N TTI cycles after the first TTI; and
the plurality of additional TTIs repeats up to M times.

5. The method of claim 1, further comprising:
measuring a signal to noise and interference level for the first user device after the first TTI in the first group of slots;
determining a modulation and coding selection (MCS) level for the first user device based on measuring the signal to noise and interference level; and
transmitting the determined MCS level to the first user device before a first of the additional TTIs.

6. The method of claim 1, further comprising:
determining an interference metric for the first user device;
determining an interference metric for an additional user device; and
assigning the first group of slots to the additional user device, if a difference between the interference metrics of the first user device and the additional user device is within a predetermined threshold.

7. The method of claim 1 wherein the first transceiver and the second transceiver reside in a first and second sector of a base station.

8. The method of claim 7, further comprising:
determining scheduling changes of user devices in adjacent sectors of the base station that interfere with the first user device; and
determining a modulation and coding selection (MCS) level for the first user device based on the determined schedule change.

9. The method of claim 1, further comprising determining groups of synchronously fixed scheduling slots, determining comprising gradually increasing a number of RBs until no more groups of synchronously fixed scheduling slots are available.

10. The method of claim 1 wherein:
the first transceiver resides in a base station of a first cell; and
the second transceiver resides in a base station of a second cell.

11. The method of claim 1, further comprising:
determining an interference vector for the first user device in the first TTI of the first group of slots, the interference vector comprising a measurement of interference to at least one neighboring cell;
determining interference vectors for a plurality of other user devices;
calculating a matching metric between the interference vector of the first user device and interference vectors of each of the plurality of other user devices;
choosing the second user device from the plurality of other user devices based on the matching metric.

12. The method of claim 11, wherein:
the at least one neighboring cell comprises a plurality of neighboring cells;
determining the interference vector for the first user device comprises determining an interference amplitudes from the first user device to each of the plurality of neighboring cells; and
determining interference vectors for a plurality of other user devices comprises determining interference amplitudes from each of the plurality of other user devices to each of the plurality of neighboring cells.

13. The method of claim 12, wherein:
determining the interference vector for the first user device further comprises ordering the interference amplitudes from the first user device to each of the plurality of neighboring cells; and
determining interference vectors for the plurality of other user devices comprises ordering interference amplitudes from each of the plurality of other user devices to each of the plurality of neighboring cells.

14. The method of claim 12, wherein calculating the matching metric between the interference vector of the first user device and interference vectors of each of the plurality of other user devices comprises calculating a mean square error between the interference vector of the first user device and interference vectors of each of the plurality of other user devices.

15. The method of claim 12, wherein choosing the second user device comprises:
comparing matching metrics for each of the plurality of other devices to a first matching threshold; and
considering only a plurality of other devices that meet the first matching threshold.

16. The method of claim 15, wherein choosing the second user device comprises choosing one of the plurality of other devices whose meeting the first matching threshold that has a best matching metric.

17. The method of claim 15, further comprising modifying the first matching threshold if none of the plurality of other devices meet the first matching threshold.

18. The method of claim 11, wherein the neighboring base station comprises a further sector within a same cell site.

19. The method of claim 11, wherein determining the interference vector comprises using downlink measurements to estimate the interference caused by a user device in an uplink.

20. A wireless base station comprising:
a transmitter; and
a receiver, wherein the base station is configured to determine a first group of slots from a plurality of groups of slots, wherein each slot comprises a resource block (RB) and a transmission time interval (TTI), and each of the plurality of groups of slots comprises a first TTI, and a plurality of additional TTIs following the first TTI, wherein the first TTI and the plurality of additional TTIs form a repeating pattern, coordinate a timing of the first TTI of the first group of slots to occur at a same time as a further first TTI of a further group of slots at a second transceiver for a same RB, assign a first user device to the first group of slots, assign a second user device to a second group of slots, transmit an assignment to the first and second user devices via the transmitter, and after the assignment to the first and second user devices is transmitted, change an assignment of the first group of slots from the first user device to a third user device, wherein the third user device is assigned to the first group of slots beginning at the first TTI of the first group of slots, and wherein the assignment change at the base station is synchronized with an assignment change at the second transceiver.

21. The wireless base station of claim 20, wherein the receiver is further configured to coordinate the first group and second group of slots with at least one neighboring base station.

22. The wireless base station of claim 20, wherein the first TTI and the plurality of additional TTIs form a repeating pattern for the first group of slots.

23. The wireless base station of claim 20, wherein, for each of the plurality of groups of slots:

a first of the plurality of additional TTIs occurs at least N TTI cycles after the first TTI; and the plurality of additional TTIs repeats up to M times.

24. The wireless base station of claim 20, wherein the base station is further configured to:

measure a signal to noise and interference level for the first user after the first TTI in the first group of slots;

determine a modulation and coding selection (MCS) level for the first user device based on measuring the signal to noise and interference level; and transmit the determined MCS level to the first user device before a first of the additional TTIs.

25. The wireless base station of claim 20, wherein the base station is further configured to:

determine an interference metric for the first user device;

determine an interference metric for the second user device; and assign the first group of slots to an additional user device, if a difference between the interference metrics of the first user device and the additional user device is within a predetermined threshold.

26. The wireless base station of claim 20, wherein the transmitter and the second transceiver reside in a first and second sector of a base station.

27. The wireless base station of claim 26, wherein the base station is further configured to:

determine scheduling changes of user devices in adjacent sectors of the base station that interfere with the first user device; and determine a modulation and coding selection (MCS) level for the first user device based on the determined schedule change.

28. The wireless base station of claim 20 wherein:

the transmitter resides in a base station of a first cell; and the second transceiver resides in a base station of a second cell.

29. A method of operating a wireless network comprising a first transceiver configured to operate with a plurality of user devices, the method comprising:

determining a first group of slots from a plurality of groups of slots, wherein each slot comprises a resource block (RB) and a transmission time interval (TTI), and each of the plurality of groups of slots comprises an RB, a first TTI, and a plurality of additional TTIs;

assigning a first user device to the first group of slots;

assign a second user device to a second group of slots;

coordinating the first group of slots with a second transceiver;

determining schedule changes of user devices communicating with the second transceiver that interfere with the first user device;

determining a modulation and coding selection (MCS) level for the first user device based on the determined schedule change; and transmitting an assignment to the first and second user devices.

30. A wireless base station comprising:

a transmitter; and a receiver, wherein the base station is configured to determine a first group of slots from a plurality of groups of slots, wherein each slot comprises a resource block (RB) and a transmission time interval (TTI), and each of the plurality of groups of slots comprises a further RB, a first TTI, and a plurality of additional TTIs, assign a first user device to the first group of slots, assign a second user device to a second group of slots, coordinate the first group of slots with a second transceiver, determine scheduling changes of user devices communicating with the second transceiver that interfere with the first user device, and determine a modulation and coding selection (MCS) level for the first user device based on the determined schedule change, and transmit an assignment to the first and second user devices via the transmitter.

* * * * *